(12) United States Patent
Hoshi et al.

(10) Patent No.: US 6,556,360 B2
(45) Date of Patent: *Apr. 29, 2003

(54) OPTICAL ELEMENT AND OPTICAL DEVICE HAVING IT

(75) Inventors: Hiroaki Hoshi, Fujisawa; Hiroshi Saruwatari, Kawasaki, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/472,890

(22) Filed: Dec. 28, 1999

(65) Prior Publication Data
US 2003/0002167 A1 Jan. 2, 2003

(30) Foreign Application Priority Data

Dec. 30, 1998 (JP) ............................... 10-377638

(51) Int. Cl.$^7$ ................................................ G02B 17/00
(52) U.S. Cl. ...................................... 359/730; 359/727
(58) Field of Search ................. 359/627, 631, 359/633–634, 637, 727–731, 834, 837

(56) References Cited

U.S. PATENT DOCUMENTS

| | | | |
|---|---|---|---|
| 4,775,217 A | 10/1988 | Ellis ............................ | 313/524 |
| 5,450,376 A | 9/1995 | Matsumura et al. ........... | 369/13 |
| 5,453,877 A | 9/1995 | Gerbe et al. ................. | 359/633 |
| 5,610,897 A | 3/1997 | Yamamoto et al. .......... | 369/124 |
| 5,973,858 A | 10/1999 | Sekita .......................... | 359/729 |
| 5,995,279 A * | 11/1999 | Ogino et al. ................. | 359/355 |
| 5,995,287 A | 11/1999 | Sekita .......................... | 359/599 |
| 5,999,311 A | 12/1999 | Nanba et al. ................. | 359/365 |
| 5,999,327 A * | 12/1999 | Nagaoka ...................... | 359/793 |
| 6,021,004 A | 2/2000 | Sekita et al. ................. | 359/676 |
| 6,084,715 A * | 7/2000 | Aoki et al. ................... | 359/627 |
| 6,097,550 A | 8/2000 | Kimura ......................... | 359/729 |
| 6,124,986 A | 9/2000 | Sekita et al. ................. | 359/691 |
| 6,163,400 A | 12/2000 | Nanba .......................... | 359/365 |
| 6,166,866 A | 12/2000 | Kimura et al. ............... | 359/729 |
| 6,181,470 B1 | 1/2001 | Sekita .......................... | 359/364 |
| 6,215,596 B1 | 4/2001 | Araki et al. .................. | 359/631 |
| 6,268,963 B1 | 7/2001 | Akiyama ...................... | 359/631 |
| 6,270,224 B1 | 8/2001 | Sunaga et al. ............... | 359/857 |
| 6,278,553 B1 | 8/2001 | Akiyama ...................... | 359/627 |
| 6,292,309 B1 | 9/2001 | Sekita et al. ................. | 359/729 |

FOREIGN PATENT DOCUMENTS

| | | |
|---|---|---|
| JP | 2-297516 | 12/1990 |
| JP | 8-292368 | 11/1996 |
| JP | 8-292371 | 11/1996 |
| JP | 11-84246 A * | 3/1999 |

* cited by examiner

Primary Examiner—Jordon M. Schwartz
(74) Attorney, Agent, or Firm—Fitzpatrick, Cella, Harper & Scinto

(57) ABSTRACT

An optical element of a transparent body has two refracting surfaces formed in surfaces of the transparent body, and a plurality of reflecting surfaces formed in surfaces of the transparent body. Light incident through one refracting surface into the transparent body is reflected successively by the plurality of reflecting surfaces to be guided to the other refracting surface. At least one of the two refracting surfaces and reflecting surfaces has an optical low pass filter.

7 Claims, 4 Drawing Sheets

OPTICAL ELEMENT AND OPTICAL DEVICE HAVING IT

BACKGROUND OF THE INVENTION

1. Field of the Invention

The present invention relates to an optical element used in silver-film cameras, video cameras, still video cameras, copiers, and so on.

2. Related Background Art

There have been proposals made heretofore for a variety of optical systems utilizing reflecting surfaces of concave mirrors and convex mirrors, and U.S. Pat. No. 4,775,217 discloses the structure of an eyepiece in an observation optical system. This patent discloses the optical system that permits a viewer to observe a display image displayed on an information display medium and also to observe a scenery image of the outside as superimposed thereon.

Japanese Patent Application Laid-Open No. 2-297516 (corresponding to U.S. Pat. No. 5,453,877) also discloses the structure of the eyepiece in the observation optical system, and the whole optical system is made thinner by making use of total reflection of light between planes arranged in parallel.

These conventional examples disclose the technology of the so-called seethrough function by which the outside scenery image is superimposed on the display image in the information display medium by use of a semi-transparent film. The use of the semi-transparent film inevitably decreases the amount of transmitted light of the display image, but, in order to prevent it, the conventional examples employ the combination utilizing the total reflection to minimize loss of light amount at each reflecting surface. In many cases employing the total reflection at each reflecting surface, only planes are used as totally reflecting surfaces in order to simplify the structure. It is, however, more desirable to effect correction for aberration by each reflecting surface while optimizing the surface shape of each reflecting surface, rather than the structure in which the totally reflecting surfaces are only planes.

If an attempt is made to satisfy the total reflection condition for all beams incident to the reflecting surfaces, degrees of freedom of the surface shape will decrease, so as to bring about the disadvantage that efficient aberration correction cannot be made at the reflecting surfaces.

In order to solve these problems, the applicant of the basic application filed Japanese Patent Applications Laid-Open No. 8-292368 and Laid-Open No. 8-292371 to propose a reflection type optical system, wherein the whole optical system was compactified by use of an optical element in which reflecting surfaces of curved surfaces and planes were formed integrally, and wherein accuracy of placement of each reflecting surface was relaxed in the reflecting optical system.

In general, the video cameras etc. using solid state image sensors having a discrete pixel structure are designed to obtain an output image by optical space sampling of image information.

However, if on this occasion an object includes high spatial frequency components there will appear a false signal. It is thus necessary to optically limit the high frequency components of an image to below the Nyquist frequency. Optical filters having such function, i.e., low pass filters are classified into those making use of the birefringence effect of such a substance as quartz or the like and those making use of refraction and diffraction by surface shape like a phase grating.

Normally, in cases wherein a birefringent plate is used as a low pass filter, the birefringent plate is placed near the image plane. This imparts constraints on the design of an optical system and the design of mechanisms in the designing process which are demanded to compatify the system. Further, the interposition of the flat plate near the image plane will give rise to ghost and flare problems, so as to bring about the disadvantage of degrading the quality of image, and the like.

When a phase grating type low pass filter is used, the constraints on the design of mechanism can be relaxed by determining the grating pattern according to the distance from the image plane and a desired image separation amount. It is, however, necessary to pay attention to the point that the interposition of the transparent member should not degrade the optical performance including spherical aberration, curvature of field, and so on.

Further, when the optical system and the phase grating low pass filter are constructed as respective separate members, highly accurate alignment is required between them and improvement is necessary in the cost and production technology.

SUMMARY OF THE INVENTION

In view of the problems discussed above, an object of the present invention is to provide an optical element that can readily achieve the desired optical low pass filter effect while accomplishing compactification and simplification.

In order to accomplish the above object, an optical element according to the present invention is an optical element comprising an entrance refracting surface to which light is incident, a plurality of reflecting surfaces, and an exit refracting surface from which the light successively reflected by the reflecting surfaces emerges, in surfaces of a transparent body, wherein at least one of the two refracting surfaces and reflecting surfaces has the function of a low pass filter.

DETAILED DESCRIPTION OF THE PREFERRED EMBODIMENTS

The present invention will be described in detail, based on the illustrated embodiments.

Figure 1:
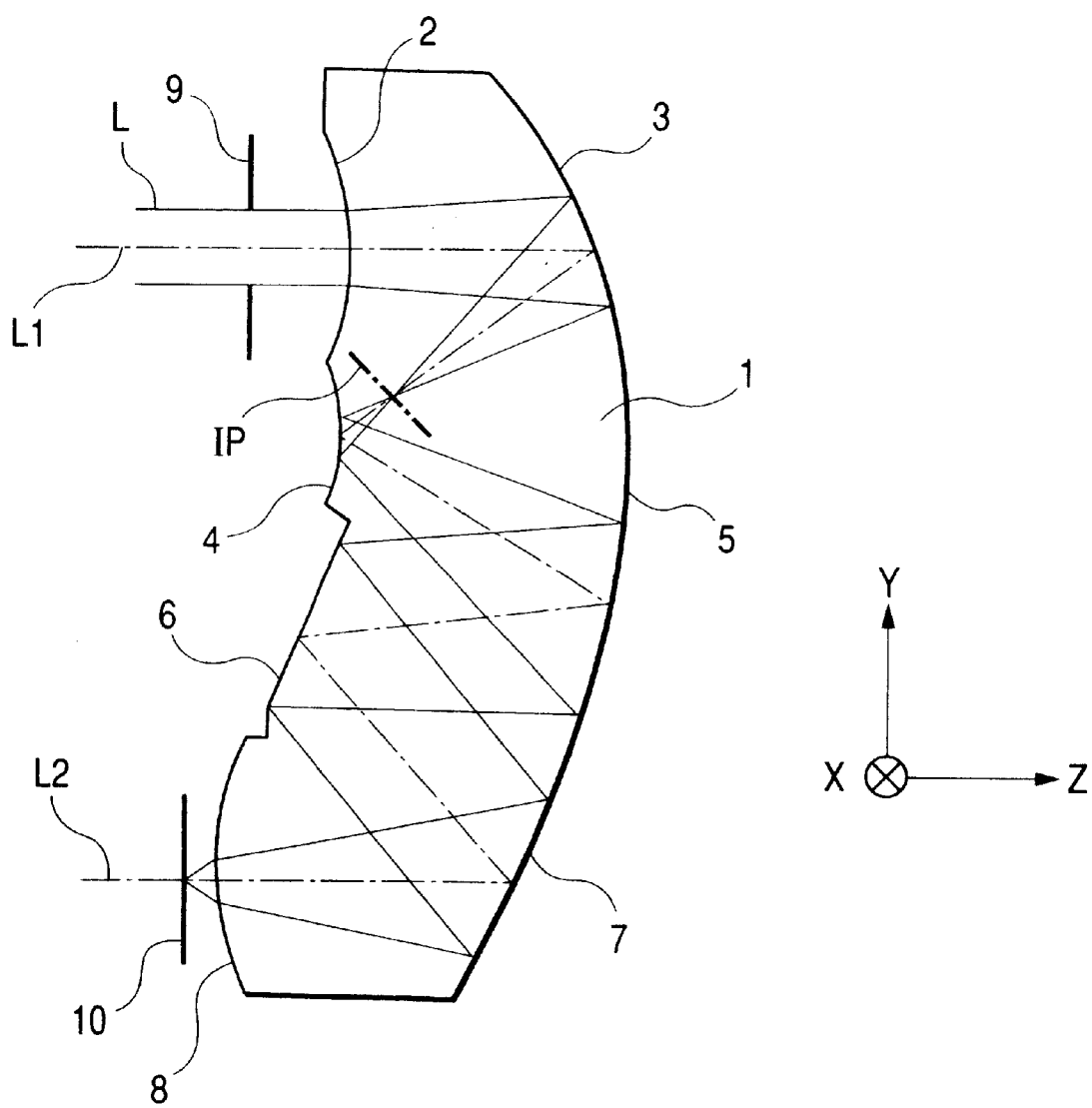
FIG. 1 is a plan view of an optical element according to an embodiment of the present invention.
Figure 2:
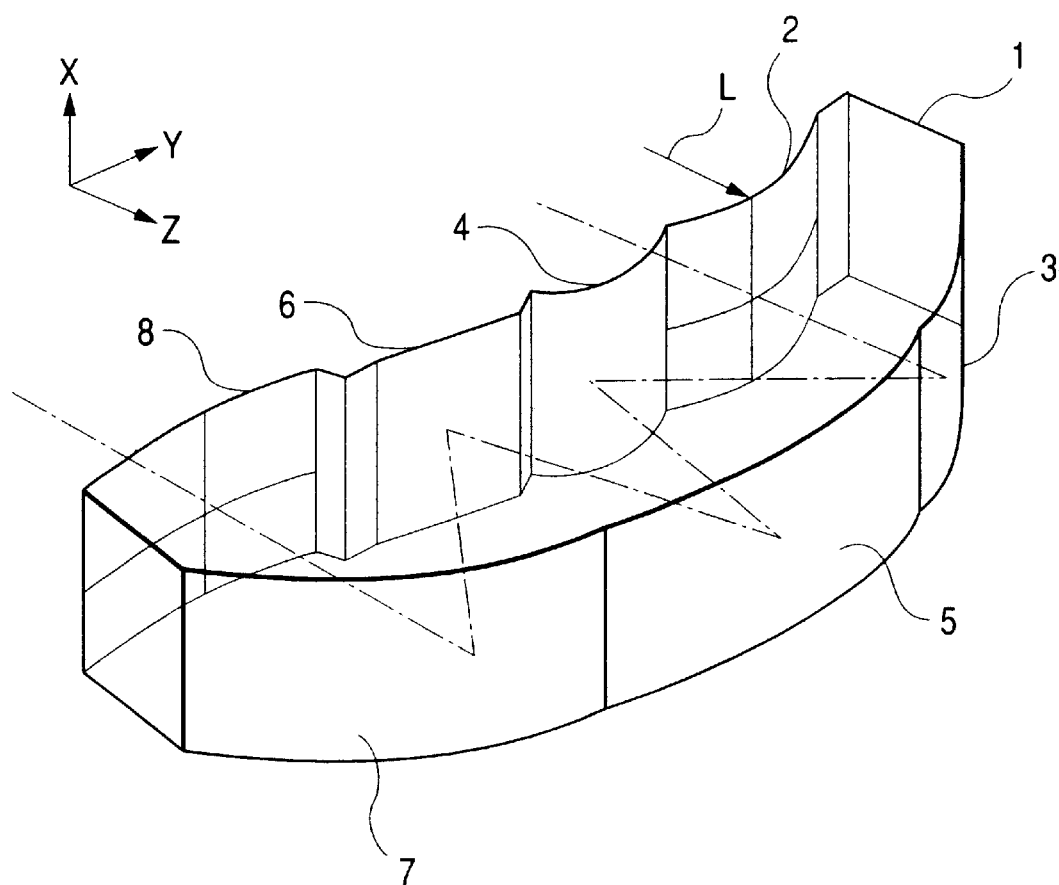
FIG. 2 is a perspective view of the optical element illustrated in FIG. 1.

FIG. 1 is a plan view of the optical element 1 having a plurality of reflecting surfaces of rotationally asymmetric shape (having no rotation symmetry axis) integrally formed, in the first embodiment, and FIG. 2 is a perspective view of this optical element 1. The optical element 1 is composed of an entrance surface of a concave refracting surface 2, reflecting surfaces of a concave mirror 3, a convex mirror 4, a concave mirror 5, a convex mirror 6, and a concave mirror 7, and an exit surface of a convex refracting surface 8, these surfaces being arranged in the stated order from the direction of incidence of light L from the object. At least one of the concave refracting surface 2 and the convex refracting surface 8 also functions as a low pass filter. Further, a stop 9 is placed on the object side of the concave refracting surface 2 and an image pickup element surface 10 of an image pickup device such as a two-dimensional CCD or the like is placed in the direction of emergence from the convex refracting surface 8.

The optical element 1 is made of an optical glass or an optical plastic or the like which is optically transparent. The three reflecting surfaces of the concave mirror 3 as the first reflecting surface formed opposite to the concave refracting surface 2, the concave mirror 5 as the third reflecting surface, and the concave mirror 7 as the fifth reflecting surface are arranged adjacent to each other and compose a first reflecting surface group. The convex mirror 4 of the second reflecting surface and the convex mirror 6 of the fourth reflecting surface formed opposite to the first reflecting surface group are arranged adjacent to each other and compose a second reflecting surface group. Further, a reference axis L1, which is indicated by a chain line, on the side of the concave refracting surface 2 of the entrance surface of the light L, passes through the center of the stop 9. A reference axis L2, which is indicated by a chain line, on the side of the convex refracting surface 8 of the exit surface, arrives at the center of the image pickup element 10. The reference axes L1 and L2 are approximately parallel or antiparallel to each other.

The light L from the object side is limited to a fixed amount of incident light by the stop 9 and thereafter is incident to the concave refracting surface 2 to become divergent light because of the power of the concave refracting surface 2. After that, the light is reflected by the concave mirror 3 to form a primary object image on an intermediate image plane IP by the power of the concave mirror 3. By forming the object image on the intermediate image plane IP in the optical element 1 in the early reflection stage in this way, increase in the optical effective area can be restrained in each surface placed on the intermediate image side of the stop 9.

The light L from the primary image formed on the intermediate image plane IP is reflected repeatedly by the convex mirror 4, the concave mirror 5, the convex mirror 6, and the concave mirror 7 to be affected by the powers of the respective reflecting surfaces and reach the convex refracting surface 8. The light L is refracted by the power of the convex refracting surface 8 to form an object image on the image pickup element surface 10.

As described above, the optical element 10 functions as a lens unit having desired optical performance and a positive power as a whole by the repetitive refractions at the concave refracting surface 2 and the convex refracting surface 8 and reflections at the concave mirror 3, the convex mirror 4, the concave mirror 5, the convex mirror 6, and the concave mirror 7.

Figure 3:
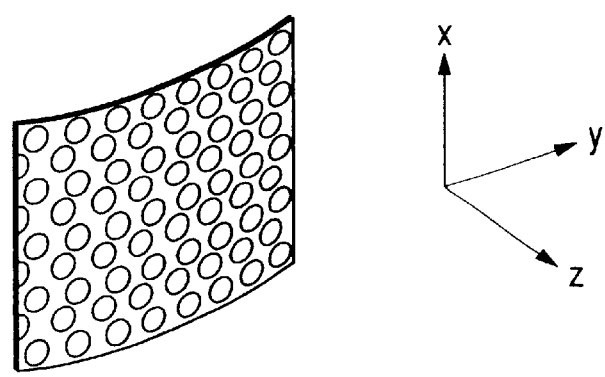
FIG. 3 is a schematic diagram of a phase-grating-type low pass filter of a domed shape.

FIG. 3 is a schematic diagram of a phase-grating-type low pass filter, in which microscopic domes arranged in the two-dimensional directions of X and Y are formed on the concave refracting surface 2 and by which phase variation is achieved in the two-dimensional directions of X and Y, thereby accomplishing the beam separation effect. The pitch and the slope shape of the microscopic domes are determined so as to gain an optimal value of an output ratio of low-order diffracted light to high-order diffracted light by diffraction.

Figure 4A:
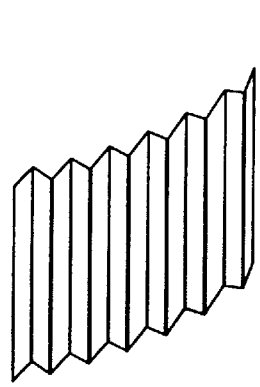
FIG. 4A and FIG. 4B are schematic diagrams of phase-grating-type low pass filters of a triangular prism shape.
Figure 4B:
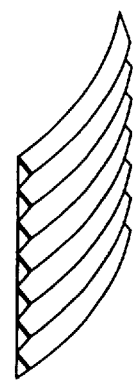

It is also possible to achieve the two-dimensional filter effect in plural directions in the frequency space, by forming a low pass filter (phase grating) of triangular prisms arranged in the Y-direction, as illustrated in FIG. 4A, on the concave refracting surface 2 and forming another low pass filter (phase grating) of triangular prisms arranged in the X-direction, as illustrated in FIG. 4B, on the concave mirror 3. It is noted that the directions of arrangement of the triangular prisms, i.e., the directions of occurrence of the phase variation, do not always have to agree with the X-direction and the Y-direction. Also, the angles between the arrangement directions are determined by the array configuration of pixels of the image pickup element and are not always 90°.

Further, there is no need for provision of the low pass filter placed immediately before the image pickup element surface 10 in the conventional optical systems, and a color correcting glass such as an infrared cut filter or the like, which used to be placed in the optical system, can be excluded from the optical path, by evaporating an interference film with wavelength selectivity on a refracting surface or a reflecting surface.

In the present embodiment the low pass filters are illustrated as to those of the domed shape and the triangular prism shape, but the cross-sectional shape thereof can be determined arbitrarily according to the desired low pass filter effect. The present embodiment shows the example in which the concave refracting surface 2 adjacent to the pupil has the low pass filter effect, but the same effect can also be expected in a configuration wherein the convex refracting surface 8 has the low pass filter effect.

Generally speaking, the accuracy of the phase grating and the like can be relaxed by generating the diffracted light near the pupil. However, it is better to generate the diffracted light of the zero order and the± first orders at the convex refracting surface 8 than to propagate it inside the optical element 1 in the following respects; the former can suppress increase of the optical effective area in each reflecting surface and is effective in terms of flare and ghost. Therefore, a preferred one can be selected according to the specifications required of the optical element 1 and the optical system.

In the low pass filters of the triangular prism shape illustrated in FIG. 4A and FIG. 4B, the phase pattern is formed so as to yield the low pass filter effect using the two surfaces of the concave refracting surface 2 and the concave mirror 3, but it can also be contemplated that the other surfaces than the aforementioned surfaces are shaped so as to bring about the phase variation in the transmitted or reflected light and the desired low pass filter effect is achieved by the effect of composition thereof. Also, not only combination of two surfaces but also three surfaces are selected to be combined as the need arises and the phase pattern is formed on each surface of the selected three surfaces so as to yield the low pass filter effect. For example, in order to decrease the X-directional dimension, the concave refracting surface 2 close to the pupil is formed in the triangular prism shape as illustrated in FIG. 4A so as to cause diffraction only in the Y-direction, which possibly enlarges the Y-directional, optical, effective area of each surface because of propagation of the diffracted light in the optical element 1 but which does not expand the optical effective area in the X-direction. Therefore, this is advantageous in decrease of the thickness in the X-direction. The triangular prism shape as illustrated in FIG. 4B is formed in either of the convex refracting surface 8 and the concave mirror 7 close thereto so as to cause diffraction only in the X-direction, thereby forming the phase grating that induces diffraction in the X-direction. This achieves the decrease of the thickness.

Further, when the optical element 1 described in the present embodiment is applied to optical systems having the zoom function with arrangement of plural optical elements as disclosed in Japanese Patent Application Laid-Open No. 8-292368, the optical system can be constructed with high transmittance and in compactified and simplified structure. This structure increases degrees of freedom of the surfaces with the low pass filter placed therein and also increases degrees of freedom of the combination of plural surfaces, thus the optimum combination of surfaces can be selected out of those of the plural optical elements according to the specifications of the zoom lens.

Figure 5:
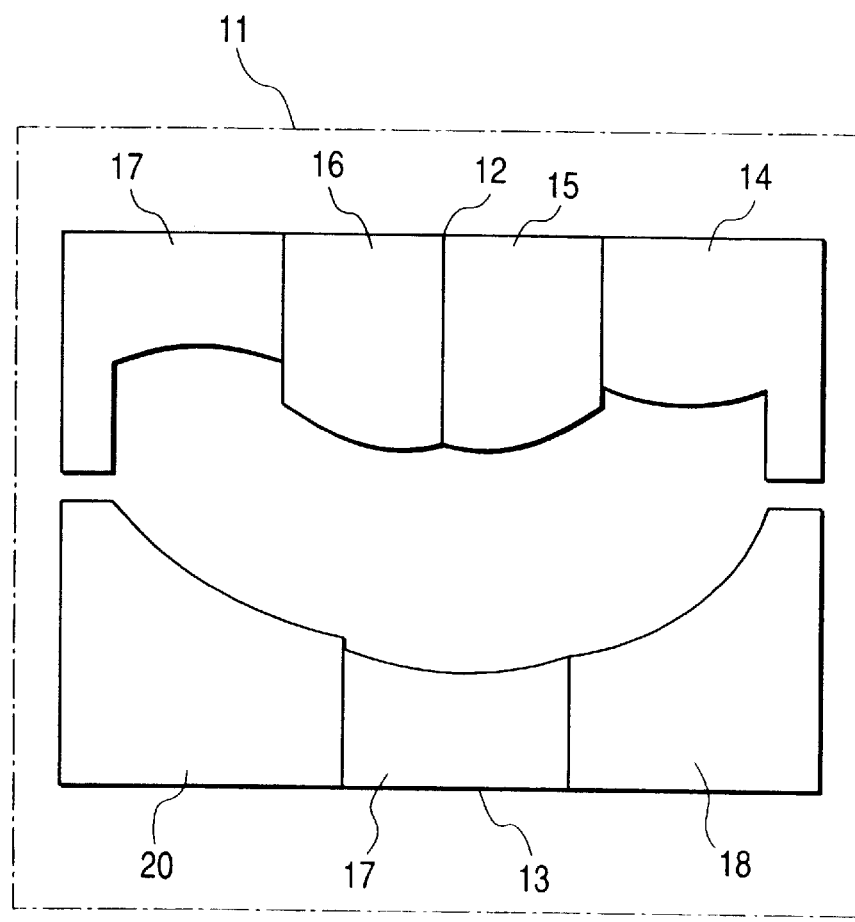
FIG. 5 is a cross-sectional view of a forming mold.

FIG. 5 is a cross-sectional view of a forming mold 11 for molding of the optical element 1. The forming mold 11 is composed of a pair of die units 12, 13 in order to integrally mold the concave refracting surface 2, concave mirror 3, convex mirror 4, concave mirror 5, convex mirror 6, concave mirror 7, and convex refracting surface 8. The die unit 12 is composed of dies 14, 15, 16, 17 corresponding to the respective surfaces of the concave refracting surface 2, the convex mirror 4, the convex mirror 6, and the convex refracting surface 8. The die unit 13 is composed of three dies 18, 19, 20 corresponding to the respective surfaces of the concave mirror 3, the concave mirror 5, and the concave mirror 7.

Since the dies 14 to 20 corresponding to the respective surfaces of plural curvatures forming the concave refracting surface 2, the concave mirror 3, the convex mirror 4, the concave mirror 5, the convex mirror 6, the concave mirror 7, and the convex refracting surface 8 are unified in the die units 12, 13, the shape of the forming mold 11 can be determined freely even in the structure in which the reflecting surfaces and refracting surfaces are eccentric to each other. This enables the integral molding of the concave refracting surface 2, concave mirror 3, convex mirror 4, concave mirror 5, convex mirror 6, concave mirror 7, and convex refracting surface 8.

The mold of the asymmetric and aspherical surfaces as in the present embodiment can be produced by cutting into the shape, using a cutting machine with high degrees of freedom of axis. The phase grating of the dome shape as illustrated in FIG. 3 can be produced with accuracy by optimizing the tip curvature and turning curvature of a cutting tool, and the cutting pitch in the cutting machine. Namely, an ideal case is to finish the asymmetric and aspherical surfaces into mirror-finished surfaces without the phase grating. In contrast, the present embodiment has the advantage that the mold 11 of the two-dimensional phase grating can be produced without extra load on the process, because the phase grating is made by positively utilizing patterns corresponding to cutting traces left by the cutting tool of the cutting machine.

It is also possible to form the one-dimensional phase grating filters of the triangular prism shape in the two asymmetric and aspherical surfaces, as illustrated in FIGS. 4A and 4B, and this configuration is also advantageous in cost and in accuracy of alignment between the optical system and the phase gratings, when compared with the optical system using the convention-phase-type low pass filter, because the entrance surface and reflecting surface having the function of the low pass filter can be produced at the same time as the molding of the optical element.

Figure 6A:
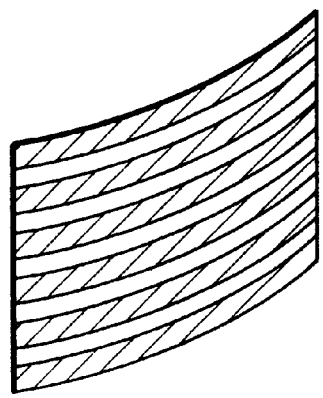
FIG. 6A and FIG. 6B are schematic diagrams of amplitude-grating-type low pass filters.
Figure 6B:
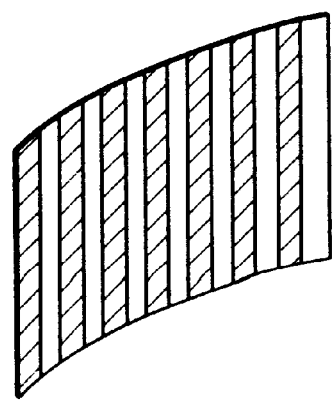

FIG. 6A and FIG. 6B are schematic diagrams of low pass filters in the second embodiment. In the first embodiment, each of the surfaces is shaped so as to have the effect of the phase-type filter, but in the present embodiment the concave refracting surface 2 is formed so that transmittances are constant in the Y-direction and vary at regular intervals in the X-direction on the concave refracting surface 2. Further, a reflecting surface is formed so that reflectances are constant in the X-direction but vary at regular intervals in the Y-direction on the convex refracting surface 8.

The low pass filters in the first embodiment were the phase-type low pass filters, whereas those in the present embodiment are the amplitude-type low pass filters. As for the effect thereof, the low pass filter effect can also be achieved two-dimensionally, as in FIGS. 4A and 4B. The combination of the concave refracting surface 2 with the convex refracting surface 8 in this way can halve the decrease of total transmittance caused by the formation of the low pass filters of only the reflecting surfaces.

It is a matter of course that an amplitude-type low pass filter can also be formed by making the two-dimensional grating in the concave refracting surface 2 or in the convex refracting surface 8 as illustrated in FIG. 3. Generally speaking, with use of the amplitude-type grating having lower diffraction efficiency than the phase-type grating, the effect is greater in suppressing the decrease of the total transmittance due to formation of the two-dimensional grating in the concave refracting surface 2 or in the convex refracting surface 8. One can freely choose either of these combinations according to desired specifications of the optical element 1 or the optical system.

In the present embodiment it is considered to be preferable in terms of formation of image that the low pass filter is formed near a plane on which variations of the low pass filter effect on on-axis light and off-axis light are as equal to each other as possible on the occasion of variation in the diameter of the stop 9 according to the amount of incident light, i.e., near the pupil plane in which the sectional area of beams subjected to the low pass filter effect is constant. In cases wherein the low pass filter is formed in the reflecting surface close to the intermediate image plane IP, the pitch of the phase grating or the microscopic prisms to be formed in this reflecting surface, or the period of reflectances can be increased by designing the optical element so as to make the image magnification small after the intermediate image plane IP, which is preferable in terms of the production technology. In such cases, the image or the pattern on the intermediate image plane IP is imaged again on the image pickup element and it is thus desirable to design the intermediate image plane IP and the surface with the low pass filter function so as to space them a fixed distance apart from each other in order to avoid imaging of the phase grating pattern on the image pickup element surface 10.

In the optical elements of the embodiments as described above, the optically acting surface (the refracting surface or the reflecting surface) also serves as a low pass filter and thus there is no need for provision of a separate low pass filter. Therefore, the desired low pass filter effect can be achieved readily while accomplishing compactification and simplification of the optical system.

What is claimed is:

1. An optical element of a transparent body comprising:
   two refracting surfaces formed in surfaces of said transparent body; and
   a plurality of reflecting surfaces formed in surfaces of said transparent body;
   wherein light incident through one refracting surface into said transparent body is reflected successively by said plurality of reflecting surfaces to be guided to the other refracting surface, wherein at least one of said two refracting surfaces comprises an optical low pass filter, said refracting surface comprising the optical low pass filter being a phase grating whose grating pattern extends in a predetermined direction, and wherein one of said plurality of reflecting surfaces comprises an optical low pass filter, said reflecting surface comprising the optical low pass filter being a phase grating whose grating pattern extends in a direction different from the predetermined direction.

2. The optical element according to claim 1, wherein at least one of said plurality of reflecting surfaces has an optical power.

3. The optical element according to claim 1, wherein at least one of said plurality of reflecting surfaces has a rotationally asymmetric shape.

4. The optical element according to claim 1, wherein said optical low pass filter is formed in at least one of said two refracting surfaces at the same time as molding of said optical element.

5. The optical element according to claim 1, further comprising:

an interference film with wavelength selectivity, said interference film being formed on at least one surface of said two refracting surfaces and reflecting surfaces.

6. An optical device comprising:

the optical element as set forth in any one of claim 2, 3, 4, 1 or 5.

7. The optical device according to claim 6, further comprising:

an image pickup element, wherein light having passed through said optical element is incident onto an image pickup surface of said image pickup element.

* * * * *

UNITED STATES PATENT AND TRADEMARK OFFICE
CERTIFICATE OF CORRECTION

PATENT NO. : 6,556,360 B2
DATED : April 29, 2003
INVENTOR(S) : Hiroaki Hoshi et al.

It is certified that error appears in the above-identified patent and that said Letters Patent is hereby corrected as shown below:

Column 1,
Line 27, "seethrough" should read -- see-through --.

Column 2,
Line 7, "compatify" should read -- compactify --.

Signed and Sealed this

Eighteenth Day of November, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,556,360 B2
DATED         : April 29, 2003
INVENTOR(S)   : Hiroaki Hoshi et al.

It is certified that error appears in the above-identified patent and that said Letters Patent is hereby corrected as shown below:

Column 1,
Line 27, "seethrough" should read -- see-through --.

Column 2,
Line 7, "compatify" should read -- compactify --.

Column 8,
Line 10, "claim 2, 3" should read -- claims 1 through 5, --.
Line 11, "4, 1 or 5," should be deleted.

This certificate supersedes Certificate of Correction issued November 18, 2003.

Signed and Sealed this

Fourteenth Day of March, 2006

JON W. DUDAS
*Director of the United States Patent and Trademark Office*